May 23, 1967 — D. E. HARRIS ET AL — 3,321,221
FASTENER
Filed Jan. 13, 1965
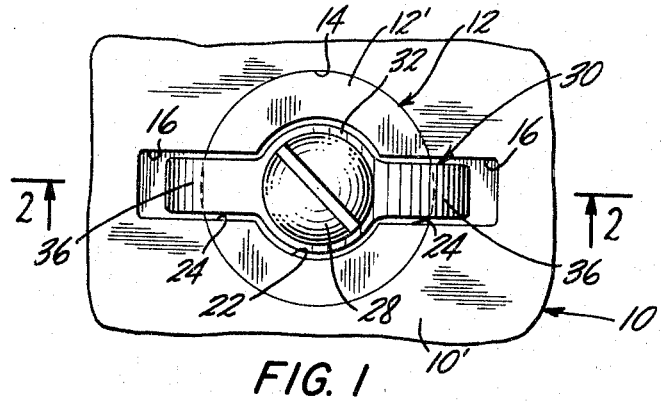
FIG. 1
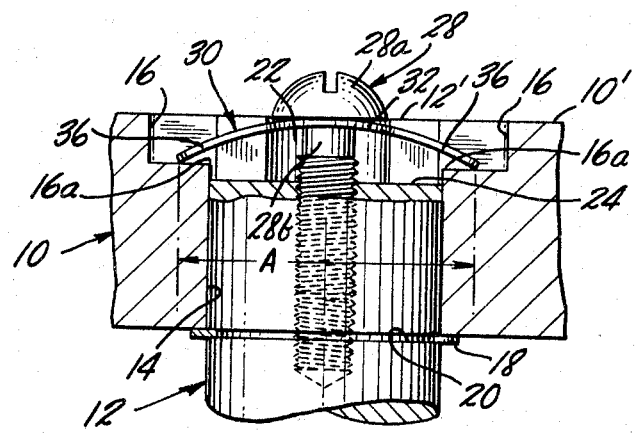
FIG. 2
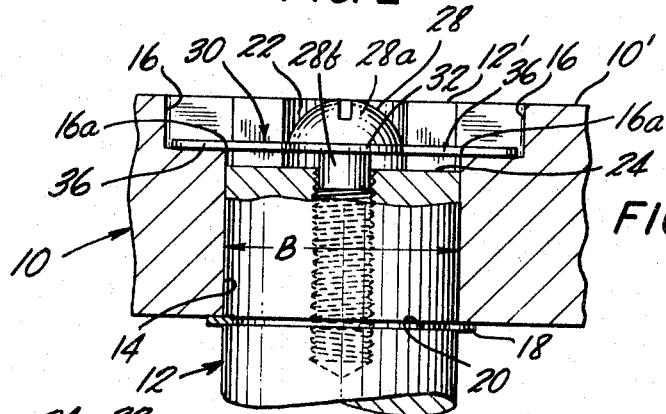
FIG. 3
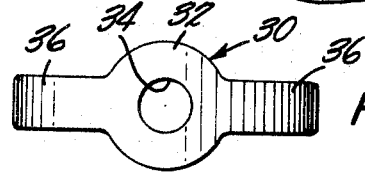
FIG. 4
FIG. 5
INVENTORS.
GUNTHER ZOEHFELD &
DWIGHT E. HARRIS
BY Brumbaugh, Free, Graves & Donohue
their ATTORNEYS

United States Patent Office 3,321,221
Patented May 23, 1967

3,321,221
FASTENER
Dwight E. Harris, Woodstock, and Gunther Zoehfeld, West Hurley, N.Y., assignors to Rotron Manufacturing Company, Inc., Woodstock, N.Y., a corporation of New York
Filed Jan. 13, 1965, Ser. No. 425,193
4 Claims. (Cl. 287—53)

This invention relates to a novel and improved fastener for connecting two members together and holding them together with a predetermined force.

In the assembly of parts of many devices, it is desirable to connect one member to another with a predetermined force, the force usually being that which is sufficient to hold them together for cooperative action but insufficient to cause undesirable strains in the members or in the connector. For example, when a number of connectors are used to connect two parts together, it is often desirable and sometimes important to provide a predetermined force on each connector so that each carries a particular design load and none carries an excessive or an ineffective load.

One way of obtaining the desired loading on connectors is to use threaded fasteners such as bolts and to use a torque limiting tool to install them. One problem with this solution, however, is that the torque required to hold the members together at a predetermined force often varies from one bolt to another, thus requiring different torque wrenches or requiring resetting a single torque wrench. Moreover, friction between the bolt head face and the contacting face of the part and between the bolt threads and the threaded hole can vary significantly, depending upon such things as the nature of the material, the friction properties of surfaces of the bolt and the member, the presence of foreign material such as filings, oil or the like on the surfaces, and variations in fits. These and other problems make it difficult to provide a predetermined preload between two interconnected parts by turning down a threaded connector with a predetermined torque.

Another way of providing a predetermined holding force is to use a spring of some type between a connector and a member being fastened by the connector to another member. One problem with a spring arrangement is that a proper initial preload on the spring must still be provided, the preload being determined by the degree to which it is compressed, that is, by the position at which the connector holding the spring is stopped. Moreover, if the spring element is compressed to full load, that is, fully compressed, then there is a danger that it will act, not as a spring, but as a solid part by being turned down somewhat beyond the full spring load. Thus, there are significant disadvantages to utilizing springs to provide the predetermined preload between connected parts, one important disadvantage being that the spring load is determined by the initial compression of the spring which is in turn established by the position of the element holding it.

The foregoing and other disadvantages of presently known fasteners for connecting members together with a predetermined preload are overcome, in accordance with the invention, by a novel and improved fastener. The fastener according to the invention comprises a connector of a type which is inserted through one of the members and into the other member and is movable into predetermined secured positions relative to that other member. The connectors are preferably of a threaded type, but press-in types and other types of connectors can also be utilized. The fastener further comprises a resilient element which has a portion received under a part of the connector, such as the head of a bolt, is initially formed with a shape such that it is supported by the adjacent member at at least two first points thereon which are spaced substantial distances from the connector, and is resiliently deflected as the connector is moved toward the member so that when the connector reaches a predetermined position, the resilient element is supported at at least one second point thereon spaced from the connector at a second distance from the connector which is substantially less than the distance of the first point from the connector.

In an exemplary form of the fastener the connector is a bolt or screw which is threaded into the first member and the resilient element is a washer which consists of a body portion having a hole therein for receiving the bolt or screw, the body portion preferably being engaged by and coextensive with the bolt or screw head, and at least two outwardly extending tangs engageable with the second member. The initial shape of the washer may be curved, so that when it is first installed, the outermost ends thereof engage the second member, and thus the washer element spans a first distance. When the screw or bolt is turned down, the washer element is flattened out until it reaches a predetermined point at which it engages parts of the second member which are spaced substantially inwardly of the outermost ends of the tangs but outwardly of the washer body portion. In this position the washer element spans a second distance substantially less than the first distance. When the span between the points at which the washer is supported is reduced, in the manner described above, the force required to turn the bolt or screw further into the first member is immediately increased substantially.

When the fastener according to the invention is installed by hand, the substantial increase in the force resisting further turning down of the screw or bolt can readily be sensed by the user, and the user will stop at that point. The fastener may also be installed by a suitable device which is arranged to detect the sudden increase in force and to stop turning down on the screw or bolt in response to an indication of such an increase.

A fastener according to the invention may also desirably be arranged to provide the additional function of locating and holding the first and second members to be connected in predetermined positions relative to each other with respect to planes at an angle to the fastener by providing cooperating slots in the first and second members and outwardly extending portions on the resilient element receivable in the slots. Such an arrangement is particularly well suited for connecting a driven member to a rotary member, such as an element to a rotary shaft.

For a better understanding of the invention, reference may be made to the following description of an exemplary embodiment, taken in conjunction with the figures of the accompanying drawings, in which:

FIGURE 1 is an end view of a shaft and a member secured to the shaft for rotation therewith by a fastener of the invention;

FIG. 2 is a view in section taken generally along the line 2—2 of FIG. 1 and illustrating the resilient element of the fastener in its initial shape and form;

FIG. 3 is a view in section similar to FIG. 2, but illustrating the resilient element in its completely installed position;

FIG. 4 is a plan view of a resilient element for the fastener according to the invention; and FIG. 5 is a side elevational view of the resilient element of FIG. 4.

Referring to FIGS. 1 to 3, the illustrated embodiment of the fastener is utilized to connect a driven member 10 to a rotary shaft 12. For example, the member 10 might be an impeller for a fan and the shaft 12 the shaft of a motor which drives the impeller. Only portions of the shaft 12 and the element 10 are illustrated in the drawings, inasmuch as the structure of these elements, except for the region around the fastener, forms no part of the invention. It will be understood by those skilled in the art that the fastener is adapted to a multitude of specific uses, not only for connecting a member to a rotary shaft but for any type of connection in which the parts are to be held together with a predetermined preload.

One important reason for limiting the loading on a fastener is to prevent distortion or breakage of the parts being connected, particularly where the parts are delicate or where a distortion would impair their proper and efficient function. For example, in small rotary compressors requiring close face clearances, the impeller is carefully designed to provide optimum operation and deformation cannot be tolerated. Thus, it is desirable to provide a predetermined loading of the fastener which connects the impeller to the motor shaft, so that distortion beyond that which may be accounted for in the design is avoided.

The body of the member 10 is provided with a bore 14 which receives the end of the shaft 12, and recesses or slots 16 are formed in the outside face 10' of the member 10 at diametrically opposite points with respect to the bore 14. The member 10 is installed on the shaft and bears against a snap ring 18, for example, or a shoulder formed on the shaft, the snap ring 18 being received in a groove 20 formed about the periphery of the shaft. When so installed, the outside face 10' of the member 10 is flush with the outer end 12' of the shaft 12.

A circular recess 22 is formed in the center of the shaft 12 to a depth somewhat greater than the depth of the slots 16 in the driven member 10, and extending outwardly from the central recess 22 at diametrically opposite points are slots 24 which are of substantially the same depth as the central recess 22. The widths of the slots 24 are approximately the same as the widths of the slots 16 in the member 10.

The member 10 is connected to the shaft 12 and held thereon by a screw 28 threaded axially into the end of the shaft 12 and inserted through a resilient element or washer 30. Referring particularly to FIGS. 4 and 5, the washer 30 includes a body portion 32 which is provided with a hole 34 for receiving the shank 28b of the bolt 28 and has a diameter slightly less than that of the circular recess 22 in the end of the shaft 12 so that it may be received in the recess 22. As best shown in FIG. 1, the body portion of the washer is also generally coextensive with the lower face of the head 28a of the screw. Formed integrally with and extending outwardly in diametrically opposite directions from the body portion of the washer are tangs 36 which are of generally rectangular shape in plan. The washer 30, as best illustrated in FIGS. 2 and 5, is formed with an initial curvature.

Referring again particularly to FIGS. 1 to 3, the outer ends of the tangs 36 of the washer 30 are received in the slots 16 of the member 10, the body portion 32 is received in the circular recess 22 of the shaft 12, and the innermost portions of the tangs 36 are received in the radially extending slots 24 in the end of the shaft.

The fastener is installed and operates in the manner described below. After the member 10 is placed on the shaft and the shaft slots 24 aligned with the slots 16 in the member 10, the washer 30 is placed in position in the aligned slots and recess with its concave surface facing the bases of the recess and slots. The screw is then started and turned down into the threaded hole in the shaft, such as by a manually turned screwdriver. Referring now to FIG. 2, the outermost ends of the tangs 36 engage the bases of the slots 16 in the driven member 10 as the screw is turned in until and for a predetermined increment of movement after the head of the screw 28 contacts the body portion 32 of the washer 30. Throughout the last mentioned predetermined increment of movement of the screw after it engages the washer 30, the washer spans a distance designated generally by the letter A in FIG. 2, the distance A being between the outermost ends of the tangs 36. (The distance A increases slightly as the washer is flattened out.)

As will be understood by those skilled in the art, the washer 30 operates in a fashion similar to a beam which is simply supported at opposite ends, the load being provided by the resilience of the washer element and acting upwardly against the head 28a of the bolt 28 and downwardly at the outer ends of the tangs 36 against the bases of the slots 16. As the screw is turned down into the threaded hole 26 of the shaft 12, the force resisting the movement of the screw 28 is gradually increased by the increasing strain as the washer element is flattened out, and reaches a maximum just before the washer 30 flattens completely, as illustrated in FIG. 3. At that maximum point, the washer is still supported across the span distance A. When the bolt is turned a little bit further, it passes through a brief transition in which the ends of the tang 36 are supported across a relatively broad area by the bases of the slots 16, and then immediately, the washer element 30 becomes supported, not at the outer ends of the tangs 36, but at points thereon a distance substantially inwardly of the ends where the tangs engage the innermost edges 16a of the bases of the slots 16, that is, where the bases of the slots 16 intersect the bore 14.

It will be noted that the distance spanned by the washer 30 is thus substantially reduced from the distance A to the distance designated by the letter B in FIG. 3. The decrease in the span from the distance A to the distance B results in a considerable relative increase in the force exerted by the resilient washer, and thus produces a substantial increase in the amount of turning force required to turn down the screw 28 further into the shaft. The increase in turning force is very marked and is readily sensed by the individual turning the screw driver. The increase thus constitutes a well defined signal to that individual that the desired preload of the member 10 axially onto the shaft 12 has been obtained. This force is, of course, determined by the design of the washer 30, and particularly by the properties and thickness of the material used and by the dimensions of the washer between the points at which the tangs 36 engage the inner edges 16a of the slots 16.

In the illustrated embodiment, it should be noted that the washer element 32 not only functions as a preload device for holding the driven member 10 on the shaft 12 with a predetermined force but also acts as a key to positively couple the shaft to the driven member for conjoint rotation. Similar key arrangements can be utilized to provide a proper registration or relative positioning between any types of members being connected by the fastener of the invention.

While in the illustrated embodiment, the fastener is completely recessed below the outer surfaces of the respective members being connected, it will be understood that the connector and washer may engage the outer face of a member being connected to another member. For example, a member having a flat surface can be connected to another member by providing a slight recess, such as a spot face, in the flat surface so that edges are provided for engagement by points inwardly of the ends of the washer element but outwardly of the connector head.

It is important for the proper operation of the fastener of the invention that the washer be arranged so that no portion of the washer which lies inwardly of an engaging part of the connector, such as the head of the screw or bolt, engages the members being connected together. If any part of the washer which positively engages the surface of the member being connected is coextensive with and in contact with the underside of the connector head, then there is a danger that the connector will be moved too far and that a load beyond the resilient load provided by the washer will be produced. Preferably, the points on the member engaged by the washer when it is in the desired position should lie a fairly substantial distance outwardly of the head of the connector, thereby limiting the effect of any slight movement of the connector toward the element to which it is secured beyond the desired point.

In the above-described use for connecting a compressor impeller to a shaft, the fastener of the invention makes it possible to provide a predetermined loading, and particularly a loading which is below that which might cause excessive heating, wear or failure of an adjacent shaft bearing, to eliminate clearance between the impeller and the shaft bearing and to provide accurate location of the impeller on the shaft. Moreover, recessing the fastener, as shown in the drawings reduces overall length and yet provides maximum shaft-bore engagement. The fastener eliminates the costly and time-consuming machining and threading operations necessary for a conventional keyed mounting. Further, the fastener provides a large torque-transmitting radius. The pre-loading of the impeller on the shaft prevents vibration and induced movements which tend to cause fretting at the adjacent surfaces.

The washer may be of many different shapes, in addition to the configuration illustrated in the drawings; for example, it could be entirely circular or could be provided with several tangs. In addition, the washer element need not be symmetrical about the axis of the connector. The surface of the member which is engaged by the washer may include a central recess, as described previously, or an outer groove or boss which is engaged by a part of the washer member.

Moreover, the washer might be formed initially as a flat member and resiliently deflected to have a curvature when completely installed. As in the case of the illustrated embodiment wherein the washer is initially curved and then flattened during installation, this form of the invention would also provide a positive torque increase indication to the installer when the span of the points of contact, such as provided by suitably stepped surface, decreases substantially. It would, of course, also provide all of the other advantages of the construction shown in the drawings.

It will be understood by those skilled in the art that the above described embodiment of the invention is merely exemplary. Many modifications and variations, such as those mentioned above, can be made by those skilled in the art without departing from the spirit and scope of the invention. All such modifications and variations are intended to be within the scope of the invention as defined in the appended claims.

We claim:

1. The combination comprising a rotary shaft, a member having a bore therein and received on the shaft, a threaded connector having a head and received longitudinally into an end of the shaft adjacent the member, and a resilient washer having a body portion engageable by the head of the connector and generally co-extensive therewith and at least two tangs extending generally outwardly from and formed integrally with the body portion, the body portion of the resilient washer being received within a recess formed in the end of the shaft, inner portions of the tangs of the washer being received in slots formed in the end of the shaft, and outer portions of the tangs being received in slots formed in the member, the slots in the member having a depth less than the depth of the recess and slots in the shaft, and the washer element having an initial arched shape relative to the surface defined by the slots in the member and shaft such that a first portion solely of each of the tangs engages a first part of the slots in the member at a first distance spaced substantially outwardly of the washer body portion and the washer being resiliently deformable upon turning of the threaded fastener into the shaft into position wherein a second portion of each of the tangs engages the inner edge of the corresponding slot in the member, whereby the span between the respective second portions of the tangs is substantially less than the span between the respective first portions of the tangs and the resistance to further movement of the fastener into the shaft is substantially increased when the inner edges of the slots in the driven member are engaged by the tangs.

2. The combination according to claim 1 wherein the edges of the tangs closely fit the edges of the slots in the shaft and member to key the member to the shaft for conjoint rotation.

3. The combination comprising a rotary member and a driven member concentric thereto, the rotary member having at least one slot therein and the driven member having at least one slot therein shallower than the slot in the rotary member and disposed radially outwardly of the slot in the rotary member, a connector carried by and movable into a predetermined secured position on the rotary member, and a resilient washer element having a portion receivable in the slots in the members to couple them together for conjoint rotation and a portion received under and engaged by a part of the connector, the washer element having an initial arched shape relative to the shape of the adjacent surfaces of the members such that it is supported by the members at at least two first support points thereon by respective first parts on the driven member spaced at respective first distances from the said connector part and such that upon movement of the connector toward the rotary member into the said predetermined secured position, at least two second points thereon engage second parts of the driven member spaced at substantial second respective distances from the said connector part, the second distances being substantially less than the first distances, whereby the span between the second points is substantially less than the span between the first points and resistance to movement of the connector into the rotary member is substantially increased after the connector reaches the said predetermined position.

4. The combination according to claim 3 wherein the washer element is substantially uniformly curved with its concave surface facing the adjacent surfaces of the members and the portion of the facing surfaces of the driven member located inwardly of the said second parts being recessed below the remainder of the facing surfaces so that the portions of the washer element between the said second points are out of contact with the driven member, the washer element being substantially flat when the connector is in the said predetermined secured position.

References Cited by the Examiner

UNITED STATES PATENTS

| | | |
|---|---|---|
| 1,798,526 | 3/1931 | Fitzgerald. |
| 2,193,826 | 3/1940 | Mann _____ 287—53 X |
| 3,150,557 | 9/1964 | Brown _____ 85—62 |

FOREIGN PATENTS

| | | |
|---|---|---|
| 245,460 | 4/1912 | Germany. |

CARL W. TOMLIN, *Primary Examiner.*

A. V. KUNDRAT, *Assistant Examiner.*